United States Patent Office 3,052,515
Patented Sept. 4, 1962

3,052,515
EXTRACTION OF URANIUM FROM AQUEOUS ACIDIC SOLUTION BY A POLYMER CHARACTERIZED BY THE APPEARANCE OF REPEAT UNITS CONTAINING ORTHO HYDROXY AROMATIC CARBOXYLIC ACID FUNCTIONS
Lorraine Guy Donaruma, Media, Pa., assignor to E. I. du Pont de Nemours and Company, Wilmington, Del., a corporation of Delaware
No Drawing. Filed Oct. 23, 1958, Ser. No. 769,065
14 Claims. (Cl. 23—14.5)

The present invention relates to a process for selectively removing uranium from a solution containing dissolved uranium salts and/or to beneficiation of uranium-containing ores and minerals. More particularly, the present invention relates to such a process involving the formation of uranyl chelates by the interaction of certain organic resins with materials which in solution yield the uranyl ion.

The resins employed in the present invention are those containing recurring units which have a carboxyl radical and a hydroxyl radical in ortho positions relative to each other on an aromatic nucleus. These aromatic repeat units may themselves be components of a linear polymer chain or they may be situated in side chains or branches which depend from a main polymer chain. The former arrangement is represented, for example, by resins which are formed by the condensation of formaldehyde with an o-hydroxybenzene carboxylic acid. The simplest of these acids is o-hydroxybenzoic acid, otherwise known as salicylic acid. Salicylic acid-formaldehyde resins are reported in the literature. See for example U.S. Patent 2,144,101, issued January 17, 1939, to W. H. Butler, and U.S. Patent 2,565,418, issued August 21, 1951, to E. C. Yackel. In the presence of an acid catalyst, such as oxalic acid or other weak or dilute organic acid, hydrochloric acid and the like, the condensation of formaldehyde and salicyclic acid tends to yield long chain linear polymers wherein the aromatic nuclei of the salicylic acid residues are linked together by methylene bridges in the following manner:

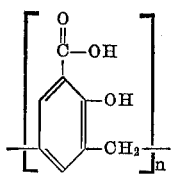

The adjacent carboxyl and hydroxyl radicals in spaced relation along the polymer chain form bonding sites of the chelating type which have a special affinity for the uranyl ion, as will be more fully hereinafter described.

The invention is operable with a variety of resinous materials having as at least one co-monomer, an o-hydroxyaromatic carboxylic acid. Thus, the salicylic acid-formaldehyde resins referred to above may be modified by the incorporation into the resin of other co-monomers or cross-linking agents, such as resorcinol, or the salicylic acid may be entirely replaced by other acids, such as resorcylic, o-hydroxynaphthoic acids, or the like. The invention is likewise operable with resins in which the aromatic nucleus having the ortho carboxyl and hydroxyl substituents is not a part of the polymer chain itself, but rather depends from a suitable main polymer chain, as will be more particularly hereinafter described. The critical feature of the resin employed in the present invention is that it contains, at spaced intervals along the polymer molecule, aromatic residues having ortho hydroxyl and carboxyl radicals. It is not material whether these aromatic residues are themselves part of a primary polymer chain, or whether they somehow depend from or are attached to a polymer chain which of itself does not possess these functional groups in this ortho relationship. The latter arrangement is particularly useful in situations wherein one of the remaining positions on the aromatic nucleus which are ortho or para to the phenolic hydroxyl group is occupied. Under such circumstances, it is not possible to build the aromatic repeat units directly into the polymer chain since, to do so, requires at least two active bonding sites, and the two positions meta to the phenolic hydroxyl of an aromatic compound are both inactive. It is possible, however, to "graft" the aromatic repeat units onto a separate polymer chain, such as a phenol-formaldehyde polymer, and for purposes of the present invention this is entirely satisfactory.

According to the invention, the resin is contacted with the uranium-containing solution at a pH above about 2.0, and preferably above about 3.0, and the chelated uranium is subsequently eluted from the resin by dropping the pH below about 2.0 with acid.

It is an object of the present invention to provide a process for the selective removal of uranium from a solution containing dissolved uranium salts. It is a further object of the present invention to provide a novel method for the beneficiation of uranium-containing ores and minerals. It is a still further object of the invention to prepare novel polymeric uranyl chelate compositions. It is an additional object of the invention to provide chelating resins of the foregoing type which are simple and economical to prepare and which may be regenerated for re-use without substantial loss of either the resin or the uranium which is being recovered. Other and additional objects will become apparent from a consideration of the ensuing specification and claims.

As indicated above, the foregoing objectives are accomplished by the use of polymeric materials containing recurring units which have a carboxyl radical and a hydroxyl radical in ortho positions relative to each other on an aromatic nucleus. These polymers have the ability to selectively form chelate compositions with substances which in solution yield the uranyl ion notwithstanding the presence of many other metallic ions. A more complete understanding of the invention will be gained from a study of the following examples.

Examples I through IV illustrate the preparation of several different resins which may be used in the practice of the present invention.

EXAMPLE I 190 g. of salicylic acid, 13 ml. of water, 114 g. 37% formaldehyde solution, and 1 g. of oxalic acid were heated with stirring to reflux. This mixture was refluxed for one hour and a mixture of 50 g. of 37% hydrochloric acid and 50 ml. of water was added. The mixture refluxed violently and the temperature rose to 98–100°. This mixture was refluxed for one hour. Cold water was then added and the resin ball removed and ground. The resin was dried overnight at 80° and 50 mm. pressure. The resin was then ground further and boiled with 2 liters of water and filtered. The resin was again dried in a vacuum drying oven to yield 230 g. of a white solid, insoluble in water and soluble in methanol which melted at 270°–280° C. and then became solid again. Ebullioscopic measurements in methanol indicated that the molecular weight of the resin was 1660. The molecular weight as determined by light scattering techniques was 6100±10%. A portion of the resin was cured further by heating at 120–150° C. to an insouble high molecular weight resin. The resin, a salicylic acid-formaldehyde polymer, will hereinafter be referred to as "Resin I."

EXAMPLE II 138 g. of salicylic acid, 200 g. 37% formaldehyde solution, and 1 g. of oxalic acid were heated to reflux. 10 g. of resorcinol was added and then a mixture of 50 g. of 37% hydrochloric acid in 50 ml. of water. The mixture was refluxed for three hours. The polymer was removed by filtration, ground, and washed twice with one liter quantities of boiling water. The polymer was cured overnight by heating at 125° C. and 55 mm. pressure. The yield of water-insoluble, infusible material was 154.8 g. Ebullioscopic measurements in methanol indicated that the molecular weight of the resin was about 1500. That product, a salicylic acid-formaldehyde resin cross-linked with resorcinol, will hereinafter be referred to as "Resin II."

EXAMPLE III 138 g. of salicylic acid, 100 g. of 37% formaldehyde solution, 13 ml. of water, and 1 g. of oxalic acid were mixed and heated to reflux. One gram of resorcinol was added followed by the addition of a mixture of 50 g. of 37% hydrochloric acid and 50 ml. of water. The mixture was refluxed until it became solid. The solid was removed by filtration and heated for 12 hours at 120° and 50 mm. pressure. The mixture was ground in a mortar and boiled for 30 minutes with one liter of water. The solid was removed by filtration and dried overnight at 80°, 50 mm. pressure. The yield of infusible material insoluble in water, soluble in methanol, was 141 g. Ebullioscopic measurements in methanol indicated that the molecular weight of the resin was about 600. The product, a salicylic acid-formaldehyde resin cross-linked with resorcinol, will hereinafter be referred to as "Resin III."

EXAMPLE IV 15.4 g. of resorcylic acid, 10 g. of 37% formaldehyde solution, 10 ml. of water, .1 g. of resorcinol and .10 g. of oxalic acid were heated to reflux. At the reflux temperature, violent foaming occurred. A mixture of 5.0 g. of 37% hydrochloric acid and 5 ml. of water was added to the foaming mixture. The reaction mixture turned solid immediately. About 50 ml. of water was added, and the mixture refluxed for one hour. The pink solid product was removed by filtration and cured overnight at 120°, 50 mm. pressure. The dry resin was ground and boiled for 20 minutes with 500 ml. of water. The product was removed by filtration and dried at 120° and 80 mm. pressure. The yield of insoluble, infusible material was 14.6 g. The product, a resorcylic-formaldehyde resin cross-linked with resorcinol, will hereinafter be referred to as "Resin IV."

In Examples II and III, the term "cross-linked" (with resorcinol) is used in its broadest sense. It is difficult to ascertain with certainty precisely how the resorcinol molecules enter the polymeric system. The best available evidence seems to indicate that in most instances a molecule of resorcinol condenses with terminal hydroxymethyl groups on the ends of adjacent polymer chains. In forming such a bridge between two chains the resorcinol thus serves as a cross-linking agent. When view in another light, however, the resorcinol may be considered a co-monomer since, in bridging two polymer chains at their terminals, it actually enters a new greatly lengthened chain (or ring). In this sense the resorcinol may also be considered a chain extender. It is also possible that some resorcinol molecules may form a bridge between two adjacent polymer molecules at intermediate points by condensing with two hydroxy radicals which are attached to the benzene rings in any repeat units of the polymer, though no substantial evidence of such an arrangement has come to light.

One procedure employed to illustrates the chelating ability of the resins prepared in Examples I—IV with respect to uranium is as follows: 50 g. of uranyl nitrate was dissolved in 500 ml. of water. The pH of this solution was adjusted to 4 by the addition of 10% sodium hydroxide solution. 10 g. of glacial acetic acid and 5 g. of sodium acetate trihydrate were added to the solution. The resins of Examples I–IV were equilibrated for 3 days with stirring in 100 ml. portions of this solution. After equilibration, the resins were removed by filtration and washed thoroughly with water. The washed resins were then leached with 50 ml. of one molar nitric acid. The leach was analyzed for grams of uranium. The leached resin was washed with water, dried, and weighed. The results of this procedure are summarized in the following table.

*Table 1*

| Resin No. | Grams of Resin Used | Grams of Uranium Leached from the Chelated Resin | Grams of Recovered Resin |
|---|---|---|---|
| I | 2 | .275 | 1.86 |
| I (Cured 12 hrs. at 150°) | 1 | .200 | 0.95 |
| II | 2 | .140 | 2.00 |
| III | 2 | .270 | 2.00 |
| IV | 1 | .090 | 1.00 |

The invention is further illustrated by the following examples:

EXAMPLE V 0.314 g. of uranyl nitrate was dissolved in 10 kg. of water. 10 g. of Resin I was added and the mixture pumped continuously at pH 5 through a centrifugal pump. After circulating for 4 days the resin was removed by filtration, washed with water, and leached with 100 ml. of 20% nitric acid for two hours. The leach was filtered and the filtrate evaporated to dryness. The residue was dissolved in concentrated nitric acid and diluted with distilled water. The weight of this solution was 34 g. The solution analyzed for 0.24% uranium. Therefore, 54.4% of the uranium was removed by the resin. 0.314 g. of uranyl nitrate per 10 kg. of water corresponds to a uranium concentration of 15 parts per million.

An ion-exchange column was prepared from one of the aforementioned resins, as is illustrated by Example VI which follows:

EXAMPLE VI 10 g. of Resin I was packed into a column and 100 ml. of a solution containing one gram of acetic acid, ½ gram of sodium acetate, and .9 g. of uranyl acetate (representing 0.5 g. uranium/100 ml.) was passed through the column. The solution passed through the column at approximately one ml. per minute. The column was then washed with 100 ml. water and eluted with 50 ml. of one molar nitric acid, and further eluted with 25 ml. more of one molar nitric acid. The eluate contained 0.205 g. of uranium. The resin in the column was washed with water and dried in a vacuum drying oven. 8.96 g. of resin was recovered. This material was equilibrated with 10 g. of uranyl acetate in 150 ml. of water overnight. The polymer was removed by filtration and washed with water. The washed chelated resin was then leached with 100 ml. of one molar nitric acid. The leach contained .18 g. of uranium. The polymer was washed with water and dried. The weight of dry resin was 8.64 g. The material was re-equilibrated at pH 4 with 5 g. of uranyl nitrate in 50 ml. of water for 12 hours. The chelated resin was removed by filtration, washed with water, and leached with 100 ml. of one molar nitric acid. The leach analyzed for .45 g. of uranium. The resin was washed and dried in a vacuum drying oven. 8.4 g. of resin was recovered.

The beneficiation of a uranium ore is illustrated in Examples VII through XII. The ore which was used in each of these examples assayed at 0.21% $U_3O_8$. Analysis of the ore by emission spectroscopy showed the following elements to be present in the concentration ranges indicated:

| Metal | Amount Present in the Ore |
| --- | --- |
| Iron | 0.6–3% |
| Magnesium | 600–3,000 p.p.m. |
| Manganese | 0.1–0.5%. |
| Silicon | >25%. |
| Sodium | 2–10%. |
| Aluminum | 2–10%. |
| Calcium | 1–5% |
| Copper | 600–3,000 p.p.m. |
| Zinc | 0.6–3%. |
| Chromium | 0.1–0.5%. |
| Titanium | 500–2,500 p.p.m. |
| Nickel | 0.1–0.5%. |
| Silver | 60–300 p.p.m. |
| Uranium | <1%. |

To extract the uranium from the ore, the ore was leached with aqueous potassium carbonate. (Leaching with 20% sulfuric acid is also operable). The uranium content of the carbonate leach liquor was determined by evaporating the liquor to dryness and analyzing the residue by X-ray fluorescence techniques. Emission spectroscopy was used to determine the other metals and elements which were present in the leach liquor including those present in extremely small amounts. By this procedure the evaporated leach was found to contain, in addition to uranium, the following:

| Metal | Amount Present in the Leach Residue |
| --- | --- |
| Magnesium | 0.3–1.5%. |
| Chromium | <50 p.p.m. |
| Silicon | 600–3,000 p.p.m. |
| Titanium | <20 p.p.m. |
| Sodium and Potassium | >25%. |
| Silver | <2 p.p.m. |
| Aluminum | 300–1,500 p.p.m. |
| Calcium | <200 p.p.m. |
| Copper | 40–200 p.p.m. |
| Zinc | <200 p.p.m. |
| Manganese | 10–50 p.p.m. |
| Iron | 700–1,000 p.p.m. |
| Nickel | 300–1,500 p.p.m. |
| Molybdenum | 400–2,000 p.p.m. |
| Vanadium | 500–2,500 p.p.m. |

To extract uranium from the ore, 10 grams of potassium carbonate was found to be just as efficient as 100 grams of the carbonate in removing the uranium from 400 grams of ore. In the acid ore leaches which were obtained by leaching with 20% sulfuric acid in lieu of potassium carbonate, the evaporated leach residue was found to contain very much larger amounts of iron than that of the carbonate leach as well as a host of other metals.

EXAMPLE VII

The ore (400 g.) was refluxed with 100 g. of potassium carbonate in 400 ml. of water for 12 hours. The solids were removed by filtration. The pH of the filtrate was adjusted to 0 and then brought back to 3 with 10% sodium hydroxide. Acetic acid (2 g.) and one gram of sodium acetate was added to the solution and the solution passed over a column of 30 g. of a salicylic acid-formaldehyde resin prepared according to the procedure of Example I. When the solution had passed through the column, the column was washed with water and eluted with 100 ml. of 10% hydrochloric acid. The column was washed with 200 ml. of water and the wash combined with the eluate. The pH of this mixture was adjusted to 8 with potassium carbonate. The failure of a precipitate to appear indicated that little or no iron was present in the eluate. The pH was dropped to 0 and then raised to 7 with ammonia. A yellow precipitate appeared which was removed by filtration and ignited. In this manner 0.3241 g. of $U_3O_8$ was obtained. This corresponded to the removal of 40.5% of the $U_3O_8$ present in the ore leach. X-ray fluorescence analysis of the matrix obtained in this manner showed that essentially pure $U_3O_8$ was obtained which contained barely detectable traces of iron and vanadium. The small amount of iron detected was no greater than that found in a concentrate of an equivalent volume of distilled water. The resin used in the column was dried and weighed. 25.5 g. of the resin was recovered.

EXAMPLE VIII

The experiment in Example VII was repeated using 30 g. of a salicyclic acid-resorcinol-formaldehyde resin prepared according to the procedure of Example III. This time the column was prewashed in 100 ml. of water containing 2 g. of acetic acid and one gram of sodium acetate. After work-up as described in Example VII, .1981 g. of $U_3O_8$ was obtained. This corresponded to the removal of 24.7% of the uranium present in the quantity of ore used. The recovery of the polymer was quantitative. X-ray fluorescence analysis of the $U_3O_8$ matrix showed that only uranium along with a very small amount of vanadium was present. The order-of-magnitude amount of vanadium present was about 0.06 mg. of vanadium per milligram of uranium.

EXAMPLE IX

The procedure of Example VII was repeated. The resin was prewashed with 200 ml. of acetic acid-sodium acetate buffer at pH 3. Prior to passing the leach solution over the resin the pH was adjusted to 3, and 5 g. of sodium acetate added. The pH was returned to 3 with acetic acid. The solution was digested for two hours on a steam bath, filtered, and passed over the resin. After work-up as described in Example VII, 0.2125 g. of $U_3O_8$ (26.6% of that present in the ore) was obtained. X-ray fluorescence analysis of the matrix showed that uranium was the major constituent with only traces of vanadium and iron being present. 25 g. of resin was recovered from the operation.

EXAMPLE X

The ore (400 g.) was stirred and refluxed with 500 g. of 20% sulfuric acid for 12 hours. The solids were removed by filtration and the pH of the ore leach adjusted to 3 with ammonia. Sodium acetate (5 g.) was added, and the pH returned to 3 by the addition of acetic acid. The leach was passed over 30 g. of polymer identical to that used in Example VII which had been prewashed at pH 3 with 200 ml. of sodium acetate-acetic acid buffer solution at pH 3. The column was washed with water and eluted with 100 ml. of 10% hydrochloric acid. The column was washed with water and the washings added to eluate. The eluate was concentrated and made strongly basic with potassium carbonate. The brown precipitate which appeared was removed by filtration and ignited. The filtrate was made acid, concentrated, and the pH adjusted to 7. A yellow precipitate appeared which was removed by filtration and ignited. The ignition of the brown precipitate yielded .1242 g. of $Fe_2O_3$. The ignition of the yellow precipitate yielded .1291 g. of $U_3O_8$. This corresponded with the removal of 1–5% of the iron present in 400 g. of ore and 16% of the $U_3O_8$ present in the ore.

EXAMPLE XI

Ten grams of the resin obtained in Example II was dissolved in acetone and precipitated by the addition of water. Enough sodium chloride was added to the mixture to coagulate the colloidal particles. The solid, water-swelled resin was isolated in a centrifuge. The tacky solid was suspended in water and boiled until acetone vapor was no longer detected by odor. The mixture was cooled, allowed to settle, and most of the water removed by decantation. The solid resin was ground under water and isolated in a centrifuge. The resin was stored under a small amount of water.

Eighty grams of the ore was leached by stirring with 100 ml. of a 2% solution of potassium carbonate at 100° for 12 hours. The solids were removed by filtration and the pH of this leach dropped to 0–1 and then raised to 3 with ammonia. The pH was then dropped to 2 by the addition of acetic acid and then raised to 3 again with 10% sodium hydroxide. The mixture was filtered and the swelled resin added to the leach along with 100 ml. of water. The total volume of the solution was 275 ml. This mixture was left stirring overnight. After stirring overnight, a small amount of powdered asbestos was added and the mixture filtered. The filter cake was washed thoroughly with water and stirred for three hours with 100 ml. of 10% hydrochloric acid. The acid leach was concentrated to 25 ml. and the pH raised to 7. The yellow precipitate was filtered and ignited. In this manner, 55.4 mg. of $U_3O_8$ was obtained. This corresponds to the removal of 35% of the uranium present in the 80 g. of ore.

EXAMPLE XII

Forty grams of the uranium ore was stirred and refluxed 12 hours with 40 ml. of water and 2 g. of potassium carbonate. The solids were removed by filtration and the filtrate evaporated to dryness. An identical leach was carried out as a control. Each of the residues was dissolved in 30 ml. of water. The pH of one of the solutions was dropped to 0–1 and the uranium then precipitated by raising the pH again to 7 with ammonia. The precipitate was isolated by filtration and ignited to yield 60.9 mg. of $U_3O_8$. The pH of the other solution was adjusted to 3 with hydrochloric acid and 10 g. of the resin used in Example VII added to the solution. After stirring for an hour a substantial lowering of the pH occurred. Sodium hydroxide was added to bring the pH back to 3–4 and the mixture allowed to stir overnight. The resin was removed by filtration, washed with water, and eluted with 50 ml. of 10% hydrochloric acid. The uranium was precipitated from the eluate by the addition of ammonia. The precipitate was isolated by filtration and ignited to yield 45.3 mg. of $U_3O_8$. This corresponds to the removal of 74.5% of $U_3O_8$ originally present in the ore leach.

EXAMPLE XIII 100 g. of a uranium ore and 10 g. of $Na_2CO_3$ was mixed with 100 ml. of $H_2O$ and boiled and stirred overnight. The ore gangue was removed by filtration and the filtrate diluted to 100 ml. The remaining 50 ml. was brought to pH 3 and boiled. The solution was extracted twice at pH 3 with 50 ml. portions of a 0.1 mer molar methyl isobutyl ketone solution of a salicylic acid-formaldehyde copolymer (Resin I). The pH of the solution was raised to 4 and given two more 50 ml. extractions. The combined extracts were stripped with 10% HCl. The strip solution analyzed for 40 mg. of U. The original leach solution analyzed for 86 mg. of U. The recovery of uranium from the leach was 46%.

EXAMPLE XIV

A 0.1 mer molar solution of a salicylic acid-formaldehyde copolymer (M.W. approximately 1500) was prepared by dissolving 15 g. (mer. wt.=150) of the resin in a liter of methyl isobutyl ketone. 100 ml. of this solution was shaken with 100 ml. of water containing 0.5 g. of uranyl acetate dihydrate. The yellow color disappeared in the aqueous phase and the ketone phase became red-brown in color. The aqueous layer was separated and the ketone layer extracted with 10% hydrochloric acid. By analysis of the acid extract it was determined that 78% of the uranium was removed from the original uranyl acetate solution in a single distribution.

EXAMPLE XV

One g. of a salicylic acid-formaldehyde resin (Resin I) was dissolved in the smallest possible amount of absolute ethanol. This solution was added with stirring to 200 ml. of a solution saturated with uranyl acetate which contained 30% by volume of ethanol. When the addition was complete, water was added to insure precipitation of the chelate, and the resin was removed by filtration. Analysis of the chelate indicated that it contained 38.9% uranium. Theoretically the totally chelated resin should contain 41.8% uranium based on the assumption that two mer units are involved in the chelation of one uranyl ion.

Examples XVI through XXI which follow, illustrate the invention with resins in which the aromatic repeat unit having the ortho carboxyl and hydroxyl radicals is not actually a part of the main polymer chain, but rather depend from a primary phenol-formaldehyde polymer, as individual unitary side chains. This type of structural arrangement is especially useful with substituted salicylic acids wherein a ring substituent occupies a position on the ring which is either ortho or para to the phenolic hydroxyl radical. In such an event, the substituted salicylic acid is only monofunctional, i.e., there is only one active ring position remaining on the aromatic nucleus, and it is not possible to polymerize such a monomer directly in the same manner as when the salicylic acid is unsubstituted. However, it is possible to "graft" such molecules onto a primary polymeric "backbone" chain, such as a phenol-formaldehyde polymer. A suitable technique for preparing such polymers is described in copending application Serial No. 769,074, filed October 23, 1958, in the name of Olden E. Paris having a common assignee with the present application.

EXAMPLE XVI

A mixture of 27.3 ml. (0.278 mole) 90% phenol, 33.8 g. (0.222 mole) 3-methylsalicylic acid, 46 ml. (0.60 mole) 37% formalin, and 4.7 g. barium hydroxide octahydrate was stirred and refluxed, becoming homogeneous in ca. in 30 min. After 13 hrs. 75% of the charged formaldehyde had reacted, and the resin began to precipitate. After a total of 14.5 hrs. reaction the aqueous phase was decanted from the resin, which was cured at 120° for 86 hrs. The cured resin, weighing 43 g., was continuously extracted with ethanol for 8 hrs. to remove unreacted monomers. The residue, weighing 28.9 g. (58% yield including sampling losses) did not soften at 300°. The dried resin was found to contain 71% carbon and 5.5% hydrogen. The theoretical structure requires 72% carbon and 5.2% hydrogen, in good agreement with the observed data. This resin had a proton capacity of 1.2 millimoles per gram. The resinous product may be represented by the following formula:

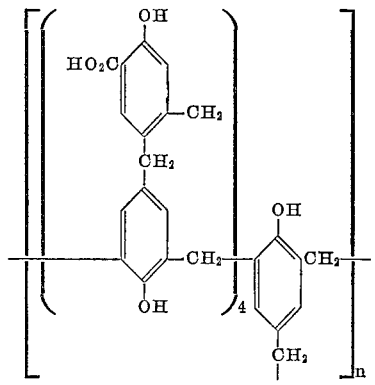

A 1.00 gram portion of this resin was slurried for 65 hrs. with 25 ml. of solution containing 0.0556 millimoles $UO_2^{+2}$ at pH 4.0. After separation of the resin, the effluent was found to contain 0.0454 millimole $UO_2^{+2}$. The resin therefore picked up 0.0102 millimole $UO_2^{+2}$ per gram. This represents the removal of 18.6% of the uranium from the original solution.

EXAMPLE XVII

A mixture of 27.3 ml. (0.278 mole) 90% phenol, 47.5 g. (0.222 mole) 3-phenylsalicylic acid, 46 ml. (0.6 mole) 37% formalin, and 4.7 g. barium hydroxide octahydrate was stirred and refluxed for 14 hrs., by which time the resin had separated completely from the aqueous phase. After decantation the resin was cured for 90 hrs. at 120°, giving 60.7 g. (76%) cured resin. Continuous extraction with ethanol for 12 hrs. left 41 g. residue, which was found to contain 75% carbon, 5.8% hydrogen. Theory requires 76% carbon, 4.9% hydrogen, indicating the presence of 82% of the theoretical quantity of acid in the resin. The resin had a proton capacity of 0.6 millimole per gram. The resinous product may be represented by the following formula:

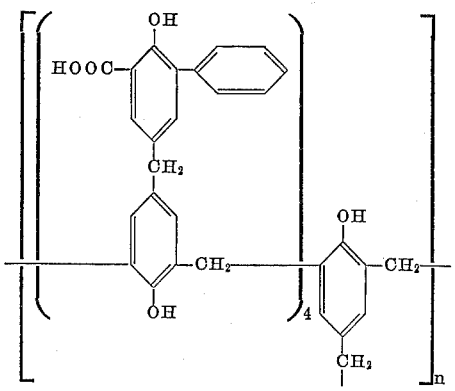

A 1.00 gram portion of this resin was slurried for 65 hours with 25 ml. of solution containing 0.0556 millimole $UO_2^{+2}$ at pH 4.0. After separation of the resin, the effluent was found to contain 0.0426 millimole $UO_2^{+2}$. The resin therefore picked up 0.0130 millimole $UO_2^{+2}$ per gram. This represents the removal of 23.4% of the uranium from the original solution.

EXAMPLE XVIII

A mixture of 23.8 g. (0.111 mole) 5-phenylsalicylic acid, 13.7 ml. (0.139 mole) 90% phenol, 23 ml. (0.3 mole) 37% formalin, and 2.4 g. barium hydroxide octahydrate was stirred and refluxed, forming an emulsion in 6 hours. The aqueous phase was decanted, and the resin was cured for 96 hours, at 120°. The cured resin, weighing 40 grams (100%) was continuously extracted with ethanol for 20 hours, leaving 23 grams insoluble residue. This resin had a proton capacity of 0.6 millimole per gram. The resinous product may be represented by the following formula:

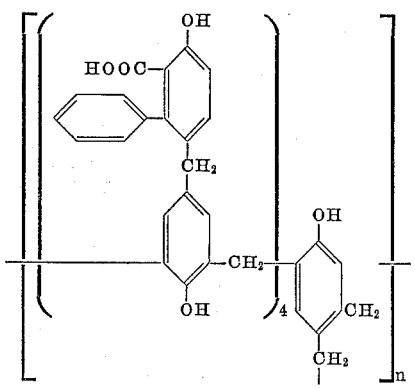

A 1.00 gram portion of this resin was slurried for 65 hours with 25 ml. of a solution containing 0.0556 millimole $UO_2^{+2}$ at pH 4.0. After separation of the resin, the effluent was found to contain 0.0481 millimole $UO_2^{+2}$. The resin therefore picked up 0.0075 millimole $UO_2^{+2}$ per gram, equivalent to a $UO_2^{+2}$ content of 0.202%.

EXAMPLE XIX

A mixture of 34.4 g. (0.20 mole) 5-chlorosalicylic acid, 24.6 ml. (0.25 mole) 90% phenol, 46 ml. (0.60 mole) 37% formalin, and 2.4 g. barium hydroxide octahydrate was stirred and refluxed, becoming homogeneous in less than 2 hours. The resin began to separate after 4.5 hours, and after a total of 24 hours was separated from the aqueous layer and cured at 120° for 72 hours. The cured resin, weighing 54 grams (85%) was continuously extracted with ethanol for 20 hours. After redrying, it contained 6.4% chlorine, indicating the presence of 53% of the theoretical amount of acid. This resin had a proton capacity of 0.6 millimole per gram.

A 1.00 gram portion of resin was slurried for 65 hours with 25 ml. of solution containing 0.0556 millimole $UO_2^{+2}$ at pH 4.0. After separation of the resin, the effluent was found to contain 0.0535 millimole $UO_2^{+2}$. The resin therefore picked up .0021 millimole $UO_2^{+2}$ per gram. This represents the removal of 2.20% of the uranium from the original solution.

EXAMPLE XX

A mixture of 18.3 grams (0.10 mole) 3-nitrosalicylic acid, 12.3 ml. (0.125 mole) 90% phenol, 19 ml. (0.25 mole) 37% formalin, and 2.0 g. barium hydroxide octahydrate was stirred and refluxed for 5 hours, when the resin was completely separated from solution. After decantation of the aqueous layer, the resin was cured at 120° for 90 hours. The cured resin, weighing 33 grams (100%) was extracted continuously with alcohol for 20 hours. The dried residue, weighing 23.5 g. contained 65% carbon, 4.4% hydrogen, and 1.9% nitrogen, indicating 76% of the theoretical acid content. The resin had a proton capacity of 0.6 millimole per gram.

A 1.00 g. portion of resin was slurred for 65 hours with 25 ml. of a solution containing 0.0556 millimole $UO_2^{+2}$ at pH 4.0. After separation of the resin, the effluent was found to contain 0.0478 millimole $UO_2^{+2}$. The resin therefore picked up .0078 millimole $UO_2^{+2}$ per gram. This represents the removal of 14.0% of the uranium from the original solution.

EXAMPLE XXI

A mixture of 12 g. (0.0656 mole) 5-nitrosalicylic acid, 8.05 ml. (0.0820 mole) 90% phenol, 15 ml. (0.20 mole) 37% formalin, 1.0 g. barium hydroxide octahydrate was stirred and refluxed for 2 hours. The resin had then separated as a rubbery mass. After removal of the aqueous layer, the resin was cured at 120° for 72 hours. The cured resin was then extracted continuously with alcohol for 20 hours, leaving 11.0 g. residue. The dried resin contained 71.2% carbon, 5.06% hydrogen, and 0.60% nitrogen, indicating an acid content of 39% of the theoretical. The proton capacity of this resin was 0.3 millimole per gram.

A 1.00 g. portion of resin was slurred for 65 hours with 25 ml. of solution containing 0.0556 millimole $UO_2^{+2}$ at pH 4.0. After separation of the resin, the effluent was found to contain .0535 millimole $UO_2^{+2}$. The resin therefore picked up .0021 millimole $UO_2^{+2}$ per gram. This represents the removal of 2.20% of the uranium from the original solution.

If the ring substituent of a substituted salicylic acid is an hydroxyl or alkoxy radical, on the other hand, a different situation exists. Since these groups are activating, a substituted salicylic acid having such a ring substituent is trifunctional, i.e., the three remaining unsubstituted ring positions are all either ortho or para to a phenolic hydroxyl radical (or alkoxy group) and are thus all active sites. Such compounds may be polymerized directly with formaldehyde and may be cross-linked with additional formaldehyde since each substituted salicylic residue along the polymer chain has one active ring position still open. The extent of cross-linking may be controlled by carefully controlling the amount of formaldehyde to which the resin is exposed. These polymers, and a suitable method for preparing them are disclosed in detail in copending application Serial No. 769,075, filed October 23, 1958, in the name of Alden E. Paris, and having a common assignee with the present invention. The use of such resins for the extraction of uranium containing dissolved uranium salts is illustrated by Examples XXII and XXIII which follow:

EXAMPLE XXII

A 1.00 g. portion of a 20 mole percent cross-linked 5-hydroxysalicylic acid-formaldehyde polymer was slurried for 65 hours with 25 ml. of solution containing 0.0556 millimole $UO_2^{+2}$ at pH 4.0. After separation of the resin, the effluent was found to contain 0.206 millimole $UO_2^{+2}$. The resin therefore picked up 0.0350 millimole $UO_2^{+2}$ per gram. This represents the removal of 62.9% of the uranium from the original solution.

EXAMPLE XXIII

A 1.00 g. portion of a 34 mole percent crosslinked 5-methoxy salicylic acid-formaldehyde resin was slurried for 65 hours with 25 ml. of solution containing 0.0556 millimole $UO_2^{+2}$ at pH 4.0. After separation of the resin, the effluent was found to contain 0.00481 millimole $UO_2^{+2}$. The resin therefore picked up 0.0507 millimole $UO_2^{+2}$ per gram. This represents the removal of 91.2% of the uranium from the original solution.

According to the present invention, it is possible to extract uranium from a solution containing dissolved uranium salts by contacting the solution with a polymeric material containing repeat residues of an o-hydroxy aromatic carboxylic acid. Resins of this type exhibit a special affinity to selectively complex the dissolved uranium salts in such solutions by means of chelate linkages. To carry out the invention, the solution may be passed through a column of the resin or over a resin bed or the like, or contacted with an immiscible solvent in which the resin is dissolved, and the polymeric uranyl chelate which results may subsequently be treated with a strong acid, such as nitric or hydrochloric acid, to elute the complexed uranium.

A great variety of polymeric materials are operable for the chelation of dissolved uranium salts in accordance with the process of the present invention. The essential feature of all such polymers is that they contain aromatic repeat units having ortho-hydroxyl and carboxyl radicals directly attached to the aromatic nucleus. The latter may be monocyclic, as in the case of salicylic and resorcylic acids, or it may be polycyclic, as is the case with o-hydroxynaphthoic acids. The precise nature and structure of the aromatic nucleus in this regard is not critical to the invention. Similarly, the presence or absence of other substitutents on the aromatic nucleus is not generally of critical significance to the invention. For example, the benzene ring, or other aromatic nucleus, may have, in addition to the o-hydroxyl and carboxyl radicals, one or more other substituents, such as an alkyl, aryl, or alkaryl radical, a halogen atom, a nitro group, a hydroxyl radical, etc. Such substituents will not hinder or otherwise affect the ability of the resin to chelate uranium. However, depending upon the other ions present in the solution, and the degree of selectivity desired, the presence of certain ring substituents in the resin may sometimes preferably be avoided. Substituents, such as the sulfonate and phosphinyl radicals, which tend to form salts or which would undergo ion exchange with alkali or alkaline earth metals would cause the resin to take up other metal ions in addition to the uranium. In the presence of HCl solutions, the amine radical will form the hydrochloride salt which will hydrolyze and thus pick up other anions present, such as acetate, sulfate, phosphate, etc. In the presence of basic solutions the amine group will complex heavy metal ions, such as copper. The desirability of avoiding such "interfering" substituents does not run to the operability of the invention, but rather to the preferred embodiment in any particular situation. The factors to be considered in this connection are the ions available in the starting solution in addition to $UO_2^{+2}$, the pH of the solution, contact time of the resin with solution, and the degree of selectivity required of the resin in any particular instance, etc. With these factors in mind, it is a relatively simple matter to ascertain which specific type of ring substituents, other than the adjacent hydroxyl and carboxyl radicals, are preferably absent in any given instance. Generally speaking, the resins employed in the present invention are quite specific in their ability to selectively chelate the uranyl ion. Minor amounts of some other metals may sometimes be taken up by the resin, especially vanadium, iron, and/or aluminum, but in such instances the amounts are usually exceedingly small compared to the uranium.

The pH of the solution containing the dissolved uranium is a critical feature of the invention. For the resin to take up the uranium from the solution, the pH must be above about 2.0, and preferably above about 3.0. Thereafter, the resin may be regenerated and the uranium eluted by lowering the pH below 2.0 with acid.

The structural nature of the novel polymeric uranyl chelates which these resins form has not been ascertained with certainty. The best available evidence based on saturation data, indicates that the chelate ring involves the uranyl ion and two hydroxyl radicals from each of two adjacent polymer molecules. Such a structure may be represented by the following:

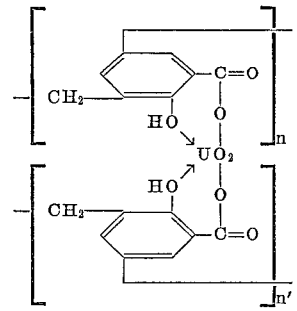

wherein "$n$" and "$n'$" are the degrees of polymerization for the respective polymer molecules.

It is also possible that the chelate ring which is formed in some instances involves the uranyl ion and two hydroxyl radicals from a single hydroxy-aromatic carboxylic acid residue, i.e., the hydroxyl radical directly attached to the aromatic ring and the hydroxyl radical of the carboxyl group attached to the ortho positions of the same aromatic ring. Such a structure may be represented as follows:

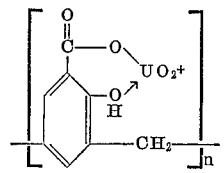

wherein the residual formal charge may be neutralized by associated anions, and "$n$" is the degree of polymerization.

The preponderance of available evidence, however, indicates that in most instances the chelate rings involve more than one polymer molecule and are not confined to single repeat units of a single molecule.

The invention has been defined in the foregoing specification. It will be readily apparent to those skilled in the art that many variations may be made in the techniques and compositions disclosed without departing from the spirit of the invention. I intend, therefore, to be limited only by the following claims.

I claim:

1. A process for the extraction of uranium from a solution containing dissolved uranium salts which comprises contacting said solution with a polymer characterized by the appearance of repeat units containing ortho hydroxy aromatic carboxylic acid functions in an acidic environment at a pH above about 2.0.

2. A process for the selective removal of uranium from a solution containing dissolved uranium salts which comprises contacting said solution with a polymer characterized by the appearance of repeat units containing ortho hydroxy aromatic carboxylic acid functions in an acidic environment at a pH above about 2.0, thereafter eluting the uranium from the resin with a strong mineral acid at a pH under 2.0 and recovering the uranium from the eluate.

3. A process for the extraction of uranium from a solution containing dissolved uranium salts which comprises contacting said solution with an o-hydroxyaromatic carboxylic acid-formaldehyde resin in an acidic environment at a pH above about 2.0, 4. A process as in claim 3 wherein the resin is a salicylic acid-formaldehyde resin.

5. A process as in claim 3 wherein the resin is a salicylic acid-formaldehyde resin cross-linked with resorcinol.

6. A process as in claim 3 wherein the resin is a resorcylic acid-formaldehyde resin.

7. A process as in claim 3 wherein the resin is a resorcylic acid-formaldehyde resin cross-linked with resorcinol.

8. A process for the selective removal of uranium from a solution containing dissolved uranium salts which comprises contacting said solution with an o-hydroxybenzene carboxylic acid-formaldehyde resin in an acidic environment at a pH above about 2.0 to chelate the dissolved uranium salts, and thereafter eluting the uranium from the chelated resin with a strong mineral acid at a pH about 2.0, and recovering the uranium from the eluate.

9. A process for the benefication of uranium-containing ores which comprises first leaching the uranium from the ore and thereafter contacting the ore leach with an o-hydroxybenzene carboxylic acid-formaldehyde resin in an acidic environment at a pH above about 2.0.

10. A process as in claim 9 wherein the ore is leached with aqueous potassium carbonate.

11. A process as in claim 9 wherein the ore is leached with aqueous sulfuric acid.

12. Uranyl chelates of o-hydroxybenzene carboxylic acid-formaldehyde polymers.

13. Uranyl chelates of salicylic acid-formaldehyde polymers.

14. Uranyl chelates of resorcylic acid-formaldehyde polymers, said resorcylic acid-formaldehyde polymers being formed from a resorcylic acid having a carboxyl group and a hydroxyl group in ortho relationship.

References Cited in the file of this patent

UNITED STATES PATENTS 2,778,843    Brown et al. _____ Jan. 22, 1957

OTHER REFERENCES

Proceedings of the International Conference on the Peaceful Uses of Atomic Energy, vol. 8, especially pp. 49–53, 64–70, 291–93 (1956).

Kunin: "Ion Exchange Resins," pp. 85–87, 112. Copyright 1950, 1958, by John Wiley & Sons, Inc.